April 16, 1963     T. V. BARNARD     3,085,493
CORN POPPING MACHINES
Filed Dec. 15, 1960
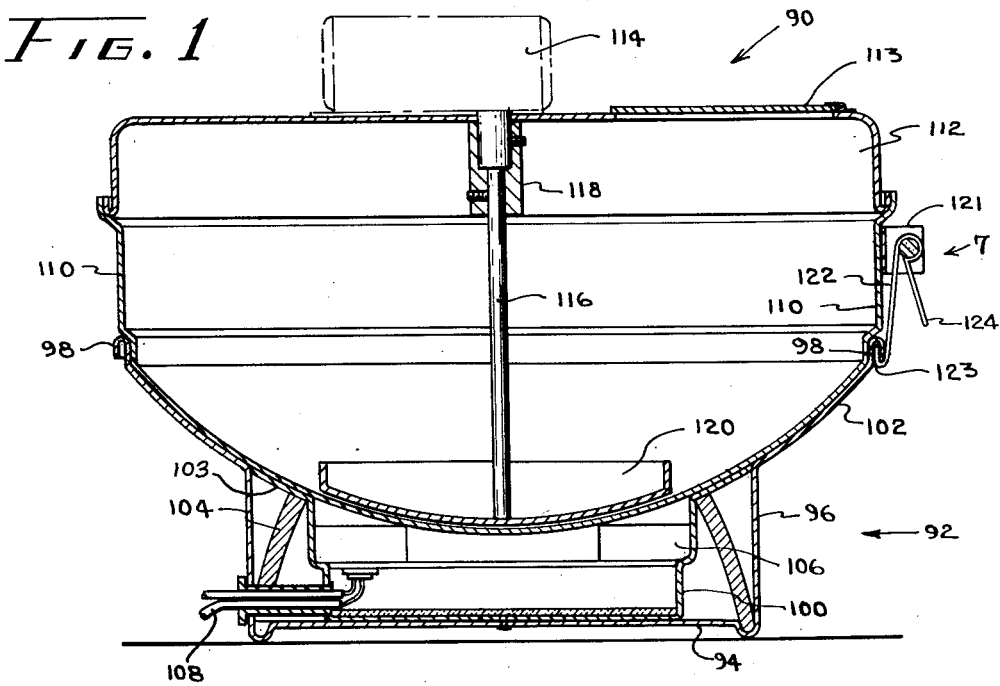
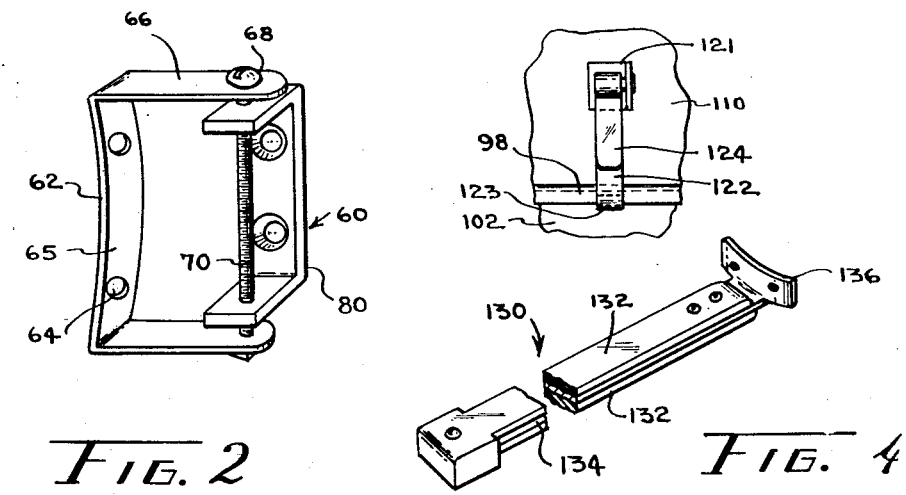
INVENTOR.
THERIDES V. BARNARD
BY
John L. Woodward
ATTORNEY

United States Patent Office 3,085,493
Patented Apr. 16, 1963

3,085,493
CORN POPPING MACHINES
Therides V. Barnard, 2516 E. 25th, Minneapolis, Minn.
Filed Dec. 15, 1960, Ser. No. 76,015
1 Claim. (Cl. 99—238.1)

This invention relates to kettles and especially to kettles for popping corn.

It is an object of this invention to provide in a corn popper a demountable handle so that the kettle can be easily packed for shipping.

It is another object of this invention to provide in a corn popper means for securely holding the cover on the bowl of the corn popper.

It is still another object of this invention to provide in a corn popper agitator means which is prevented from slipping in the cover when it is opened.

It is another object of this invention to provide in a corn popper stand means for hingedly mounting a bowl support to the top of the stand.

It is another object of this invention to provide a support means housing an electric heating element and which support removably mounts a kettle.

It is a further object of this invention to provide stop means on a kettle pivotally mounted on a machine to prevent the kettle tipping over.

With these and other objects in view, my invention consists in the construction, design and arrangement of the parts thereof whereby the objects sought are attained. Changes may be made in the construction and arrangement of the parts without departing from the spirit and scope of the invention hereinafter described in connection with the accompanying drawings.

Referring to the drawings:

FIGURE 1 is a vertical sectional view of a corn popper, removably mounted on a support means.

FIGURE 2 is a perspective view of a hinge for the corn popper of FIGURE 1.

FIGURE 3 is a side view of a fulcrum latch for the kettle of FIGURE 1.

FIGURE 4 is a perspective view of a removable handle.

A hinge 60 comprises a U-shaped bracket 62 provided with holes 64 in its curved base portion 65 for securing the base 65 of the bracket 62 horizontally to one side of wall of the support of the kettle shown in FIGURE 1. The outer ends of the legs 66 of the bracket 62 are provided with holes 68 for mounting a screw thread bolt 70 held therein by a nut. A U-shaped bracket 80 has its legs loosely or pivotally mounted on the bolt 70, and holes are provided in the base of the bracket 80 so that the base of the bracket can be secured by screw means to the top of a popcorn popping machine. The hinge 60 permits the bowl of the kettle to be tilted for dumping popping corn into a compartment (not shown) of a popcorn machine.

The popcorn machine 90 includes a base 92 which comprises a bottom wall 94 and a vertical annular wall 96 from the upper end of which extends arc-shaped flange 102. A circular housing 100 is mounted in the base 92 and is provided with arc-shaped flange 103, complementing flange 102. An annular brace 104 is spaced between the bottom wall 94 and the arc-shaped flange 103. An electric heating element 106 is mounted in the base 92 and lead-in wires 108 are connected thereto. The upper end of the wall 96 is secured to the flange 102.

The machine 90 is provided with a bowl portion 110 which is removably mounted on the arc-shaped flange 102 of the base 92. A removable cover 112 is tightly fitted to the bowl 110 and is provided with a hinged door 113. An electric motor 114 is connected to shaft 116 by gear reduction means 118 for rotating a wire finger 120 engaging the inside bottom of the bowl 110 at a speed which results in better popped corn. When sufficient corn is popped in the kettle 90, it will automatically push open door 113 and fall into a housing.

The heating element 106 is centrally positioned adjacent the bottom of the bowl 110 for quickly and easily heating it.

A right angle bracket 121 is riveted to the side of bowl 110. A fulcrum latch 122 is carried by the bracket 121 and a catch 123 of the latch 122 is adapted to be secured on the annular rim 98 of the bowl 110 when the latch is in locked position. The latch arm 124 is elevated to release the latch from engagement with the rim 98 of the bowl 110. The latch quickly secures and releases the bowl 110 to the housing 102.

The handle 130 is provided with upper and lower sections 132 of Bakelite, and an intermediate strip of metal 134. The sections 132 and strip 134 are secured together by screws. A bracket 136 formed on the outer end of the strip 132 provides means for demountably mounting the handle 130 to a popcorn kettle.

It is thought that the invention and many of its attendant advantages will be understood from the foregoing description.

Having thus described my invention, what I claim is:

In a popcorn kettle bowl support, a base comprising a bottom wall, a vertical annular wall extending therefrom, and an arc-shaped flange extending from the upper end of said annular wall; a housing mounted within the base, and having a bottom supported on the bottom wall of the base, said housing having a vertical annular portion extending from said bottom and an arc-shaped flange extending from the upper end of said annular portion, both arc-shaped flanges complementing one another to be adapted together removably to mount a bowl; an electrical heating element supported within the housing annular portion; and lead-in wires connected to said heating element and extending through said base and said housing.

References Cited in the file of this patent

UNITED STATES PATENTS

| | | |
|---|---|---|
| 2,117,872 | Barnard | May 17, 1938 |
| 2,125,749 | Rahr | Aug. 2, 1938 |
| 2,194,852 | Guldenfinger et al. | Mar. 26, 1940 |
| 2,570,126 | Hobbs | Oct. 2, 1951 |

FOREIGN PATENTS

| | | |
|---|---|---|
| 669,682 | Great Britain | Apr. 9, 1952 |